(12) United States Patent
Zhao et al.

(10) Patent No.: US 8,752,628 B2
(45) Date of Patent: Jun. 17, 2014

(54) FLUID FLOW CONTROL USING CHANNELS

(75) Inventors: Liang Zhao, Plano, TX (US); Jason D. Dykstra, Carrollton, TX (US); Michael Linley Fripp, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/990,243

(22) PCT Filed: Jun. 26, 2012

(86) PCT No.: PCT/US2012/044134
§ 371 (c)(1),
(2), (4) Date: May 29, 2013

(87) PCT Pub. No.: WO2014/003715
PCT Pub. Date: Jan. 3, 2014

(65) Prior Publication Data
US 2014/0014351 A1    Jan. 16, 2014

(51) Int. Cl.
*E21B 34/06* (2006.01)
*F15C 1/16* (2006.01)

(52) U.S. Cl.
USPC ......... 166/316; 166/242.1; 137/813; 137/809

(58) Field of Classification Search
CPC .............. E21B 34/06; F15C 1/16; F15C 1/14
USPC ................ 166/316, 242.1; 137/813, 809
See application file for complete search history.

(56) References Cited

U.S. PATENT DOCUMENTS

| 3,586,104 A | 6/1971 | Hyde |
| 2011/0042091 A1 | 2/2011 | Dykstra et al. |
| 2011/0308806 A9 | 12/2011 | Dykstra et al. |
| 2012/0111577 A1 | 5/2012 | Dykstra et al. |

FOREIGN PATENT DOCUMENTS

EP         2383425         11/2011

OTHER PUBLICATIONS http://www.thefreedictionary.com/channel.*
International Patent Application No. PCT/US2012/044134, "International Search Report and Written Opinion", mailed Feb. 25, 2013, 11 pages.

* cited by examiner

*Primary Examiner* — Shane Bomar
*Assistant Examiner* — Wei Wang
(74) *Attorney, Agent, or Firm* — Kilpatrick Townsend & Stockton LLP

(57) ABSTRACT

A fluid flow control device disposable in a bore can include channels that can direct fluid flow based on one or more properties of the fluid more robustly. The channels may include a side channel between two other channels. The side channel can allow fluid flow to affect fluid flowing in one of the channels. Devices according to some aspects can differentiate between fluids having close, but different, properties and direct the fluid accordingly. Examples of fluid properties based on which the device can direct fluid include fluid density, fluid velocity, fluid viscosity, and Reynolds number of the fluid flow.

9 Claims, 6 Drawing Sheets

FLUID FLOW CONTROL USING CHANNELS

CROSS-REFERENCE TO RELATED APPLICATIONS

This is a U.S. national phase under 35 U.S.C. 371 of International Patent Application No. PCT/US2012/044134, titled "Fluid Flow Control Using Channels," filed Jun. 26, 2012, the entirety of which is incorporated herein by reference.

TECHNICAL FIELD OF THE INVENTION

The present invention relates generally to assemblies for controlling fluid flow in a bore in a subterranean formation and, more particularly (although not necessarily exclusively), to assemblies that are capable of restricting fluid flow by directing fluid using channels.

BACKGROUND

Various devices can be installed in a well traversing a hydrocarbon-bearing subterranean formation. Some devices control the flow rate of fluid between the formation and tubing, such as production or injection tubing. An example of these devices is an autonomous fluid selector that can select fluid, or otherwise control the flow rate of various fluids into the tubing.

An autonomous fluid selector can select between wanted and unwanted fluids based on relative viscosity of the fluids. For example, fluid having a higher concentration of unwanted fluids (e.g. water and natural gas) may have a certain viscosity in response to which the autonomous fluid selector directs the unwanted fluid in a direction to restrict the flow rate of the unwanted fluid into tubing. The autonomous fluid selector includes a flow ratio control assembly and a vortex assembly usable to select fluid based on viscosity. The flow ratio control assembly includes two flow paths. Each flow path includes narrowed conduits that are configured to restrict fluid flow based on viscosity of the fluid. For example, one conduit in the first passageway may be narrower than the second conduit in the second passageway, and configured to restrict fluid having a certain relative viscosity more than fluid having a different relative viscosity. The second conduit may offer relatively constant resistance to fluid, regardless of the viscosity of the fluid.

Although this autonomous fluid selector is very effective in meeting desired fluid selection downhole, additional types of autonomous fluid selectors are desirable that can direct fluid for flow control based on small differences in fluid properties.

SUMMARY

Certain aspects of the present invention are directed to affecting fluid flowing in channels of a fluid flow control device disposed in a wellbore by using a channel subassembly capable of allowing fluid that has a certain property to affect fluid flowing through one or more channels of the channel subassembly.

One aspect relates to a subassembly for a fluid flow device that can be disposed in a subterranean wellbore. The subassembly includes a chamber, a first channel, a second channel, and a side channel. The chamber includes an exit opening. The first channel can direct fluid from a first inlet toward the chamber. The second channel can direct fluid from a second inlet toward the chamber. The side channel can allow fluid to flow from the second channel to the first channel to affect fluid flowing in the first channel.

A feature relates to the side channel being adapted to allow an amount of fluid to flow from the second channel to the first channel to affect fluid flowing in the first channel. The amount of fluid can be based on at least one fluid property.

Another feature relates to the property being at least one of Reynolds number of the fluid, fluid density, fluid velocity, or fluid viscosity.

Another feature relates to including in the subassembly a primary channel, a first diverted channel, and a second diverted channel. The primary channel can be in fluid communication with the first channel. The primary channel can direct fluid toward the exit opening. The first diverted channel can be in fluid communication with the first channel. The second diverted channel can be in fluid communication with the second channel. The first diverted channel and the second diverted channel can direct fluid toward a tangential opening of the chamber. The side channel can allow an amount of fluid to flow from the second channel to the first channel to guide fluid to flow toward the primary channel. The amount of fluid can be based on at least one property of the fluid.

Another feature relates to including in the subassembly a first primary channel, a second primary channel, and a diverted channel. The first primary channel can be in fluid communication with the second channel. The second primary channel can be in fluid communication with the first channel. The diverted channel can direct fluid toward a tangential opening of the chamber. The diverted channel can be in fluid communication with the first channel. The first primary channel and the second primary channel can direct fluid toward the exit opening. The side channel can allow an amount of fluid to flow from the second channel to the first channel to guide fluid to flow toward the diverted channel. The amount of fluid can be based on at least one property of the fluid.

Another feature relates to property of the fluid including a viscosity of the fluid above a threshold. The threshold can be based on a physical configuration of the fluid flow control device. The fluid flow control device can restrict fluid flow by an amount that is based on the viscosity of the fluid.

Another feature relates to the first inlet and the second inlet being configured for allowing fluid to flow from a fluid delivery subassembly, and the chamber being a vortex chamber.

Another feature relates to the first inlet being separate from the second inlet.

Another aspect relates to a fluid flow control device that can be disposed in a wellbore. The fluid flow control device includes a vortex chamber, a fluid delivery subassembly, and a channel subassembly. The vortex chamber includes an exit opening. The channel subassembly can be positioned between the vortex chamber and the fluid delivery subassembly. The channel subassembly includes a first channel, a second channel, and a side channel. The first channel can provide a first flow path for fluid from the fluid delivery subassembly toward the chamber.

The second channel can provide a second flow path for fluid from the fluid delivery subassembly toward the chamber. The side channel can provide fluid communication between the first channel and the second channel.

Another feature relates to the side channel being adapted to allow fluid to flow from the second channel to the first channel to affect fluid flowing in the first channel.

Another feature relates to the side channel being adapted to allow an amount of fluid to flow from the second channel to the first channel to affect fluid flowing in the first channel, the amount of fluid being based on at least one fluid property.

Another feature relates to the channel subassembly including a primary channel, a first diverted channel, and a second diverted channel. The primary channel can be in fluid communication with the first channel. The primary channel can direct fluid toward the exit opening. The first diverted channel can be in fluid communication with the first channel. The second diverted channel can be in fluid communication with the second channel. The first diverted channel and the second diverted channel can direct fluid toward a tangential opening of the chamber.

Another feature relates to the side channel being adapted to allow an amount of fluid to flow from the second channel to the first channel to guide fluid to flow toward the primary channel. The amount of fluid can be based on at least one property of the fluid.

Another feature relates to the channel subassembly including a first primary channel, a second primary channel, and a diverted channel.

The first primary channel can be in fluid communication with the second channel. The second primary channel can be in fluid communication with the first channel. The diverted channel can direct fluid toward a tangential opening of the chamber. The diverted channel can be in fluid communication with the first channel. The first primary channel and the second primary channel can direct fluid toward the exit opening.

Another feature relates to the side channel being adapted to allow an amount of fluid to flow from the second channel to the first channel to guide fluid to flow toward the diverted channel. The amount of fluid can be based on at least one property of the fluid.

Another feature relates to the property of the fluid including a viscosity of the fluid above a threshold. The threshold can be based on a physical configuration of the fluid flow control device. The fluid flow control device can restrict fluid flow by an amount that is based on the viscosity of the fluid.

Another feature relates to the fluid flow control device including a first inlet and a second inlet. The first inlet can allow fluid to flow from the fluid delivery subassembly to the first channel. The second inlet can allow fluid to flow from the fluid delivery subassembly to the second channel.

Another feature relates to the fluid flow control device being configured to restrict fluid flowing from a formation to a production tubular disposed in the wellbore by an amount that is based on at least one property of the fluid.

Another aspect relates to a channel subassembly for a fluid flow control device that can be disposed in a subterranean wellbore. The channel subassembly includes a first channel, a second channel, and a side channel. The first channel can direct fluid from a first inlet in fluid communication with a fluid delivery subassembly toward a chamber having an exit opening. The second channel can direct fluid from a second inlet in fluid communication with the fluid delivery subassembly toward the chamber. The side channel can allow an amount of fluid to flow from the second channel to the first channel to direct fluid flowing in the first channel toward a fourth channel that can allow fluid to flow to the chamber. The amount of fluid is based on at least one property of the fluid.

These illustrative aspects and features are mentioned not to limit or define the invention, but to provide examples to aid understanding of the inventive concepts disclosed in this application. Other aspects, advantages, and features of the present invention will become apparent after review of the entire application.

DETAILED DESCRIPTION

Certain aspects and features relate to a fluid flow control device having channels that can direct fluid flow based on one or more properties of the fluid more robustly as compared to fluid flow control devices that do not implement channels. For example, devices according to some aspects can differentiate between fluids having close, but different, fluid property values and direct the fluid accordingly. Examples of fluid properties based on which the device can direct fluid include fluid density, fluid velocity, fluid viscosity, and Reynolds number of the fluid flow.

One aspect includes a side channel that can provide fluid communication between two channels that allow fluid to flow towards a chamber having an exit opening. Fluid communication between two channels includes the ability, but not the requirement, for fluid to flow from one channel to another. The amount of fluid that may flow through the side channel can depend on one or more properties of the fluid. The amount of fluid that may flow through the side channel can affect fluid flowing through the other channel. A channel may be a passageway, flow path, or otherwise an area through which fluid may flow.

The channels may be in a fluid flow control device, such as a valve, that can automatically reduce flow rate of unwanted fluid and that can automatically allow wanted fluid to pass through the device with limited to no restriction. Fluid can enter the device from an inlet and exit through an exit opening. The fluid can travel through one or more of the channels. Depending on the channel traveled by the fluid (which may in part depend on one or more properties of the fluid), the fluid may be directed to spin in a chamber or to travel substantially towards the exit opening. For example, the device may be configured to cause fluid having a higher concentration of unwanted fluid to spin and to cause fluid having a higher concentration of wanted fluid to flow more directly to the exit opening. Spinning fluid may result in a high pressure drop that reduces the flow rate of the fluid exiting through the exit opening. Otherwise, the pressure drop can be decreased to allow fluid to exit without substantial restriction.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present invention.

Figure 1:
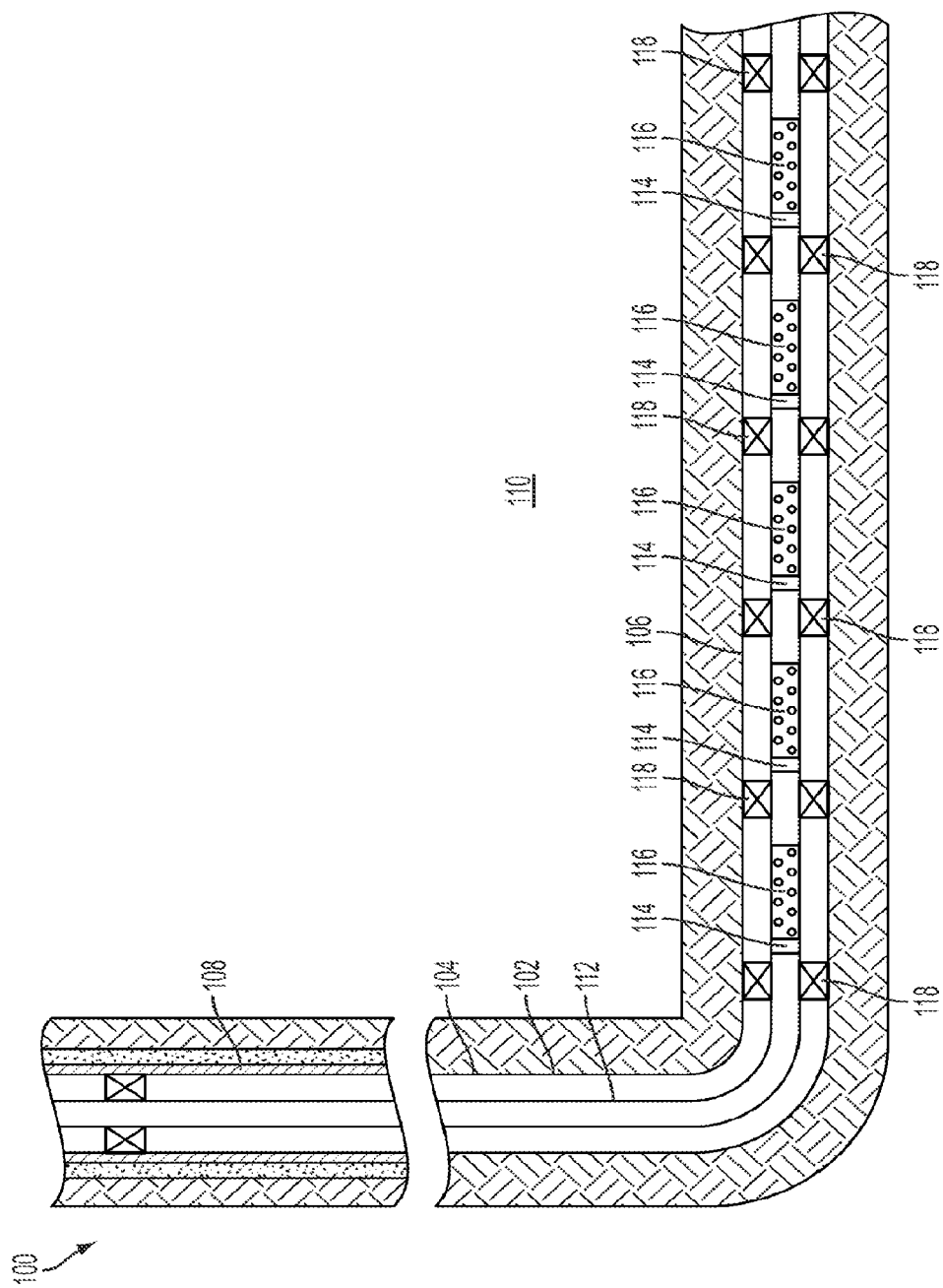
FIG. 1 is a schematic illustration of a well system having fluid flow control devices that include channels according to one aspect of the present invention.

FIG. 1 depicts a well system 100 with fluid flow control devices having channels according to certain aspects of the present invention. The well system 100 includes a bore that is a wellbore 102 extending through various earth strata. The wellbore 102 has a substantially vertical section 104 and a substantially horizontal section 106. The substantially vertical section 104 and the substantially horizontal section 106 may include a casing string 108 cemented at an upper portion of the substantially vertical section 104. The substantially horizontal section 106 extends through a hydrocarbon bearing subterranean formation 110.

A tubing string 112 extends from the surface within wellbore 102. The tubing string 112 can provide a conduit for formation fluids to travel from the substantially horizontal section 106 to the surface. Fluid flow control devices 114 and production tubular sections 116 in various production intervals adjacent to the formation 110 are positioned in the tubing string 112. On each side of each production tubular section 116 is a packer 118 that can provide a fluid seal between the tubing string 112 and the wall of the wellbore 102. Each pair of adjacent packers 118 can define a production interval.

Each of the production tubular sections 116 can provide sand control capability. Sand control screen elements or filter media associated with production tubular sections 116 can allow fluids to flow through the elements or filter media, but prevent particulate matter of sufficient size from flowing through the elements or filter media. In some aspects, a sand control screen may be provided that includes a non-perforated base pipe having a wire wrapped around ribs positioned circumferentially around the base pipe. A protective outer shroud that includes perforations can be positioned around an exterior of a filter medium.

Fluid flow control devices 114 that include channels according to some aspects that can allow for control over the volume and composition of produced fluids. For example, fluid flow control devices 114 may autonomously restrict or resist production of formation fluid from a production interval in which unwanted fluid, such as water or natural gas for an oil production operation, is entering. "Natural gas" as used herein means a mixture of hydrocarbons (and varying quantities of non-hydrocarbons) that exists in a gaseous phase at room temperature and pressure and in a liquid phase and/or gaseous phase in a downhole environment.

Formation fluid flowing into a production tubular section 116 may include more than one type of fluid, such as natural gas, oil, water, steam and carbon dioxide. Steam and carbon dioxide may be used as injection fluids to cause hydrocarbon fluid to flow toward a production tubular section 116. Natural gas, oil and water may be found in the formation 110. The proportion of these types of fluids flowing into a production tubular section 116 can vary over time and be based at least in part on conditions within the formation and the wellbore 102. A fluid flow control device 114 according to some aspects can reduce or restrict production from an interval in which fluid having a higher proportion of unwanted fluids is flowing through the fluid flow control device 114.

When a production interval produces a greater proportion of unwanted fluids, a fluid flow control device 114 in that interval can restrict or resist production from that interval. Other production intervals producing a greater proportion of wanted fluid, can contribute more to the production stream entering tubing string 112. For example, the fluid flow control device 114 can include channels that can control fluid flow rate based on one or more properties of fluid, where such properties depend on the type of fluid—wanted or unwanted fluid.

Although FIG. 1 depicts fluid flow control devices 114 positioned in the substantially horizontal section 106, fluid flow control devices 114 (and production tubular sections 116) according to various aspects of the present invention can be located, additionally or alternatively, in the substantially vertical section 104. Furthermore, any number of fluid flow control devices 114, including one, can be used in the well system 100 generally or in each production interval. In some aspects, fluid flow control devices 114 can be disposed in simpler wellbores, such as wellbores having only a substantially vertical section. Fluid flow control devices 114 can be disposed in open hole environments, such as is depicted in FIG. 1, or in cased wells.

Figure 2:
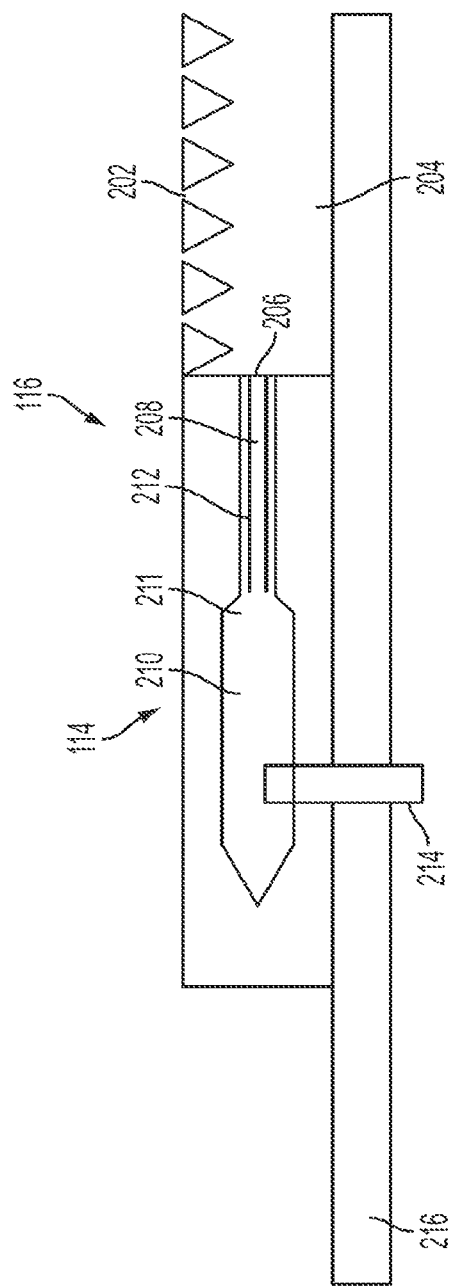
FIG. 2 is a cross-sectional side view of a fluid flow control device and a screen assembly according to one aspect of the present invention.

FIG. 2 depicts a cross-sectional side view of a production tubular section 116 that includes a fluid flow control device 114 and a screen assembly 202. The production tubular defines an interior passageway 204, which may be an annular space. Formation fluid can enter the interior passageway 204 from the formation through screen assembly 202, which can filter the fluid. Formation fluid can enter the fluid flow control device 114 from the interior passageway through an inlet 206 to a flow path 208 of a chamber 210. Disposed in the flow path 208 of the chamber 210 are channels 212. The channels 212 can direct fluid to flow into a vortex or to an outlet 214. The vortex is usable by the chamber 210 to restrict or allow fluid to flow though the outlet 214 via an exit opening in the chamber 210 by different amounts to an internal area of tubing 216. Although one outlet 214 is depicted in FIG. 2, fluid flow control devices according to various aspects and features may include any number of outlets and/or exit openings.

Figure 3:
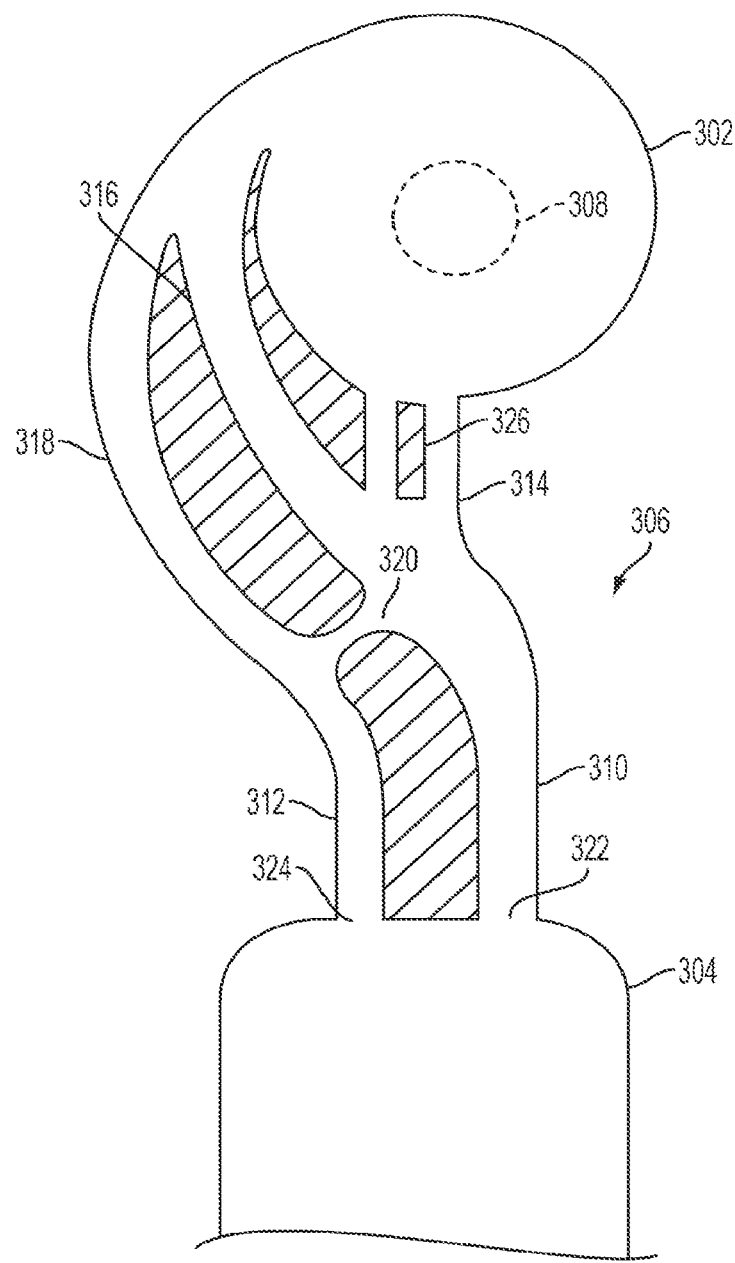
FIG. 3 is a cross-sectional top view of a fluid flow control device that includes channels according to one aspect of the present invention.

Fluid flow control devices with channels may have a variety of configurations by which the channels direct fluid for restriction or no restriction, as the case may be. FIG. 3 depicts one example of a fluid flow control device that includes a chamber 302, a fluid delivery subassembly 304, and a channel subassembly 306.

The chamber 302 includes an exit opening 308 that can allow fluid to exit the fluid flow control device. In some aspects, the chamber 302 is a vortex chamber having a circular-shaped path in cross-section that can allow fluid entering the chamber 302 in one direction to rotate, creating a vortex about the exit opening 308. The fluid delivery subassembly 304 may be any type of fluid delivery device or devices that can allow fluid to flow to the channel subassembly 306.

The channel subassembly 306 can include channels for directing fluid in one or more directions toward the chamber 302. The channel subassembly 306 in FIG. 3 includes two channels 310, 312 that provide fluid communication between the fluid delivery subassembly 304 and a primary channel 314, two diverted channels 316, 318, and a side channel 320. The primary channel 314, two diverted channels 316, 318, and the side channel 320 are included in the channel subassembly 306. "Primary channel" as used herein is used to identify one channel in the channel subassembly 306 and should not be interpreted as signifying any status to the channel unless expressly noted. Similarly, "diverted channels" as used herein is used to identify two or more channels in addition to a primary channel and should not be interpreted to convey any structural configuration unless expressly noted. In addition, a "side channel," which may be referred to as an auxiliary channel, as used herein should not be interpreted as requiring necessarily a "side" configuration in some manner unless expressly noted.

The first channel 310 includes an inlet 322 for receiving fluid from the fluid delivery subassembly 304 and can direct fluid toward the primary channel 314 and a first diverted channel 316, depending on a property of the fluid. The second channel 312 includes an inlet 324 for receiving fluid from the fluid delivery subassembly 304 that can direct fluid toward the second diverted channel 318 and the side channel 320, depending on one or more properties of the fluid.

In some aspects, the diverted channels 316, 318 may provide alternate flow paths to the chamber 302 as compared to the flow path provided by the primary channel 314. In FIG. 3, for example, the diverted channels 316, 318 are offset to one side of the primary channel 314, as viewed from the cross-sectional top view of the fluid flow control device, and provide alternate flow paths that converge near a tangential opening to the chamber 302. FIG. 3 depicts the diverted channels 316, 318 as being on the left-hand side of the primary channel 314 in the view depicted in FIG. 3. Diverted channels 316, 318 according to other aspects may be positioned on the right-hand side of the primary channel 314, or in other configurations, in the same view as currently depicted in FIG. 3.

The side channel 320 provides fluid communication between the first channel 310 and the second channel 312. Fluid can flow from the second channel 312 through the side channel 320 to the first channel 310 and affect an amount of fluid that flows toward the primary channel 314.

For example, fluid having a higher proportion of wanted fluid flowing through the fluid flow control device may result in more fluid flowing through the side channel 320 to the first channel 310. Wanted fluid having certain fluid properties may, for example, be attracted to a higher amount of wanted fluid having similar fluid properties that is flowing through the first channel 310 such that more fluid flowing through the second channel 312 desires to flow through the side channel 320. When more fluid flows through the side channel 320, the fluid from the side channel 320 can direct or influence more fluid in the first channel 310 to the primary channel 314. The primary channel 314 can direct fluid toward the exit opening 308 of the chamber 302. The primary channel 314 includes a divider 326 defining two flow paths. In other aspects, the primary channel 314 does not include the divider 326.

Fluid having a higher proportion of unwanted fluid flowing through the fluid flow control device may result in less fluid flowing through the side channel 320 to the first channel 310 and more fluid flowing through second diverted channel 318. For example, unwanted fluid may have a lower viscosity such that it has less desire to travel through the side channel 320. Less fluid flowing through the side channel 320 can allow more fluid flowing through first channel 310 to flow through the first diverted channel 316. Diverted channels 316, 318 can direct fluid toward the chamber 302 in a tangential direction. Fluid directed toward the chamber 302 in a tangential direction can cause fluid to flow into a vortex in the chamber 302 to restrict the fluid from exiting the chamber through exit opening 308.

The side channel 320 can amplify small differences in fluid properties since a relatively small amount of fluid with some wanted fluid properties can travel through the side channel 320 to help push the wanted fluid towards the primary channel 314. For example, the side channel 320 can cause disruption to forces in unwanted and wanted fluid. The disruption can be added to the effect of different channels through which unwanted and wanted fluid are already directed to increase an amount of force for directing fluid toward the proper channel—primary or diverted channel. Although two channels 310, 312 and two diverted channels 316, 318 are depicted, any number of channels—diverted, channels from a fluid delivery subassembly, or otherwise—can be used.

Sizes and geometric configurations of channels may be modified to direct more or less fluid having different levels of one or more properties. For example, the channels can be sized and configured such that fluid having a viscosity level within a range, or above or below a threshold, may be directed within the fluid flow control device as wanted fluid. For example, a side channel may be configured with a slightly less straight path to the first channel from the second channel such that less fluid have some portion of wanted fluid flows through the side channel.

Figure 4:
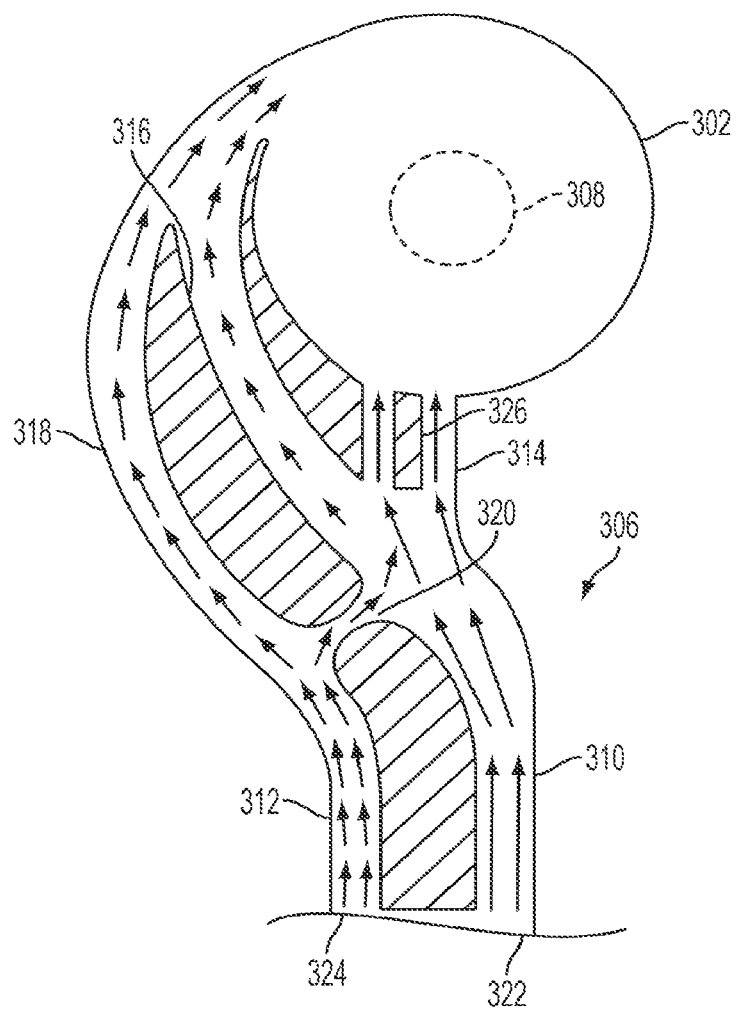
FIG. 4 is a cross-sectional top view of part of the fluid flow control device of FIG. 3 with a higher concentration of wanted fluid flowing through channels according to one aspect of the present invention.
Figure 5:
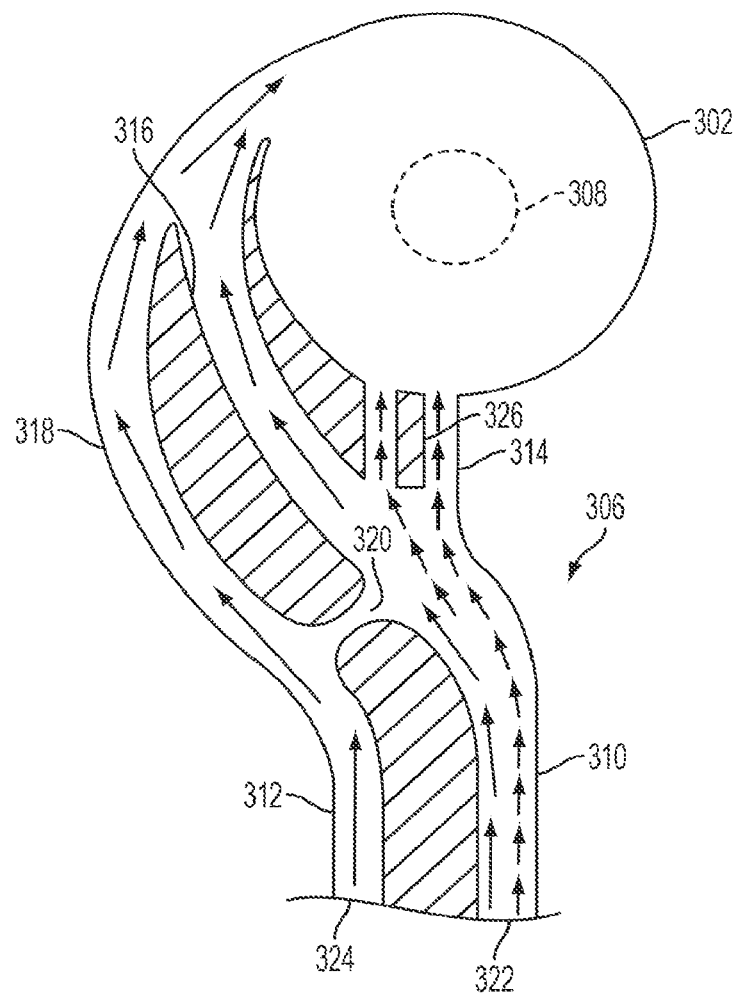
FIG. 5 is a cross-sectional top view of the fluid flow control device of FIG. 3 with a higher concentration of unwanted fluid flowing through the channels according to one aspect of the present invention.

FIGS. 4-5 depict fluid flow through the fluid flow control device of FIG. 3 without depicting the fluid delivery subassembly 304. Fluid flow is depicted in FIGS. 4-5 using arrows in which the length of the arrow represents an amount of fluid flow. For example, a longer arrow represents a greater amount of fluid flow while a shorter arrow represents a lower amount of fluid flow.

FIG. 4 depicts the fluid flow control device in which a higher proportion of wanted fluid is flowing through the fluid flow control device. The fluid delivery subassembly (not shown) can direct the fluid through inlet 322 to the first channel 310 and some fluid through inlet 324 to the second channel 312. Fluid flowing through the first channel 310 flows toward the primary channel 314 and the first diverted channel 316. More of the fluid flows toward the primary channel 314 than the first diverted channel 316. For example, the fluid flow control device may be configured to allow more wanted fluid having a certain property to flow straighter from the inlet 322 to the primary channel 314 than to the first diverted channel 316.

The fluid delivery subassembly can deliver some of the wanted fluid through inlet 324 to the second channel 312. Fluid flowing through the second channel can flow toward the second diverted channel 318 and the side channel 320. The fluid flow control device is configured to allow fluid to flow through the side channel 320 that desires to travel straight based on one or more properties of the fluid. Fluid flowing through the side channel 320 can flow to the first channel 310 and can direct more wanted fluid to flow into the primary channel 314 than to the first diverted channel 316 such that more wanted fluid is provided to the chamber 302 through the primary channel 314 and allowed to exit the exit opening 308 without substantial restriction. Some of the fluid may flow through diverted channels 316, 318 and be directed tangentially into the chamber 302. The amount of fluid directed tangentially into the chamber 302 may be low enough, however, to avoid restricting fluid from exiting the chamber 302.

The side channel 320 can amplify selection of wanted fluid by allowing more wanted fluid having one or more certain properties to be directed towards the chamber 302 via the primary channel 314.

In FIG. 5, a higher proportion of unwanted fluid is flowing through the fluid flow control device. The fluid delivery subassembly (not shown) can cause some fluid to enter inlet 322 and flow through channel 310 toward the first diverted channel 316 and primary channel 314. The fluid delivery subassembly can cause fluid to enter inlet 324 and flow through the second diverted channel 318 such that some fluid flows into the chamber 302 tangentially. Fluid flowing tangentially into the chamber 302 can cause more fluid to flow into a vortex in the chamber 302 and restrict fluid flowing into the chamber 302 from primary channel 314 or diverted channels 316, 318, for at least some amount of time, from exiting through the exit opening 308. The channel subassembly 306 is configured such that unwanted fluid have certain one or more properties does not flow through the side channel 320 such that fluid flowing through channel 310 is not directed towards the primary channel 314. In other aspects, some fluid may flow through the side channel 320, but not enough to direct much fluid toward the primary channel 314.

Figure 6:
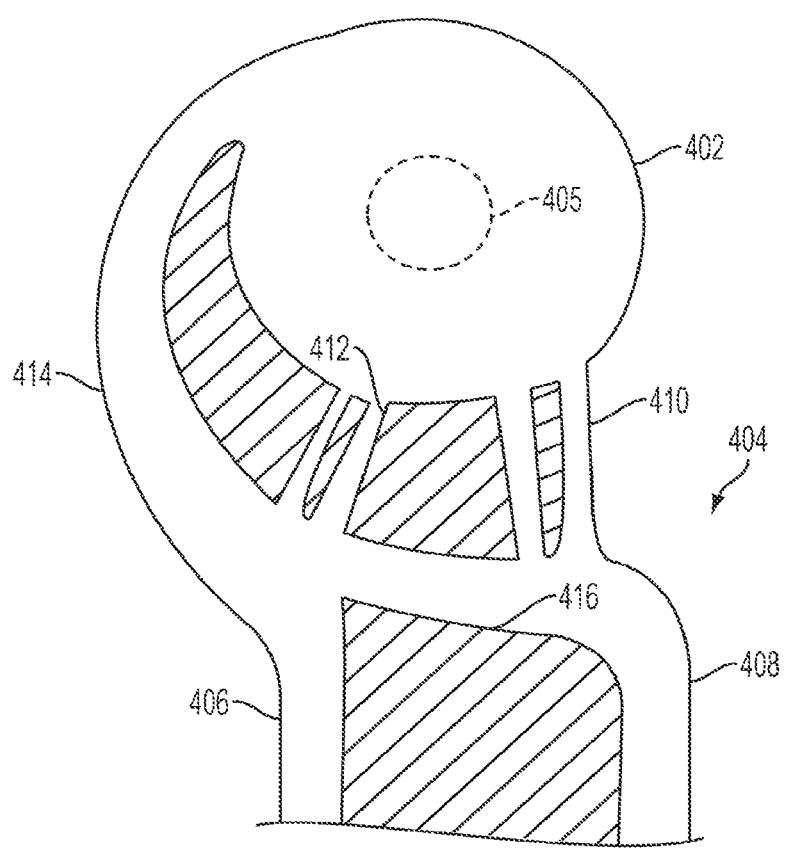
FIG. 6 is a cross-sectional top view of a fluid flow control device that includes channels according to a second aspect of the present invention.

Fluid flow control devices according to various aspects could of course have different configurations. FIG. 6 depicts a fluid flow control device according to a second aspect. The fluid flow control device shown in FIG. 6 includes a chamber 402 and a channel subassembly 404. The chamber 402 includes an exit opening 405.

The channel subassembly 404 includes a first channel 406 and a second channel 408 that provide flow paths from a fluid delivery subassembly or other subassembly. The channel subassembly 404 also includes two primary channels 410, 412, a diverted channel 414, and a side channel 416. The two primary channels 410, 412 can direct fluid flow into the chamber 402 toward the exit opening 405. The diverted channel 414 can direct fluid tangentially toward the chamber 402.

The side channel 416 can provide a flow path between the first channel 406 and the second channel 408. In some aspects, the fluid flow control device can be configured such that unwanted fluid, such as fluid have one or more certain properties, that may flow through the second channel 408 is directed through the side channel 416 to the first channel 406. The unwanted fluid flowing through the side channel 416 to the first channel 406 may direct more unwanted fluid flowing through the first channel 406 to flow towards the diverted channel 414 instead of flowing through the second primary channel 412 such that more fluid restriction occurs in the chamber 402. The fluid flow control device can be configured such that a lower amount, or no, wanted fluid flowing through the second channel 408 flows through the side channel 416 such that fluid flowing through the first channel 406 is not directed from flowing through the second primary channel 412.

The foregoing description of the aspects, including illustrated aspects, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention.

What is claimed is:

1. A subassembly for a fluid flow control device adapted to be disposed in a subterranean wellbore, the subassembly comprising:
   a chamber having an exit opening;
   a first channel for directing fluid from a first inlet toward the chamber;
   a second channel for directing fluid from a second inlet toward the chamber; and
   a side channel for allowing fluid to flow from the second channel to the first channel to affect fluid flowing in the first channel;
   a primary channel in fluid communication with the first channel, the primary channel being configured for directing fluid toward the exit opening;
   a first diverted channel in fluid communication with the first channel; and
   a second diverted channel in fluid communication with the second channel,
   wherein the first diverted channel and the second diverted channel are parallel to each other, separated by a common sidewall, and configured for directing fluid toward a tangential opening of the chamber,
   wherein the side channel is adapted to allow an amount of fluid to flow from the second channel to the first channel to guide fluid to flow toward the primary channel, the amount of fluid being based on at least one property of the fluid.

2. The subassembly of claim 1, wherein the at least one fluid property comprises:
   Reynolds number of the fluid;
   fluid density;
   fluid velocity; or
   fluid viscosity.

3. The subassembly of claim 1, wherein the first inlet and the second inlet are configured for allowing fluid to flow from a fluid delivery subassembly,
   wherein the chamber is a vortex chamber.

4. The subassembly of claim 1, wherein the first inlet is separate from the second inlet.

5. The subassembly of claim 1, wherein the side channel is adapted to allow an amount of fluid to flow from the second channel to the first channel to affect fluid flowing in the first channel, the amount of fluid being based on at least one fluid property.

6. A channel subassembly for a fluid flow control device adapted to be disposed in a subterranean wellbore, the channel subassembly comprising:
   a first channel for directing fluid from a first inlet in fluid communication with a fluid delivery subassembly toward a chamber having an exit opening;
   a second channel for directing fluid from a second inlet in fluid communication with the fluid delivery subassembly toward the chamber;
   a side channel for allowing an amount of fluid to flow from the second channel to the first channel to direct fluid flowing in the first channel toward a fourth channel that is configured to allow fluid to flow to the chamber, wherein the amount of fluid is based on at least one property of the fluid;
   a first diverted channel in fluid communication with the first channel; and
   a second diverted channel in fluid communication with the second channel,
   wherein the first diverted channel and the second diverted channel are parallel to each other, separated by a common sidewall, and configured for directing fluid toward a tangential opening of the chamber.

7. The channel subassembly of claim 6, wherein the fourth channel includes:
   a first primary channel in fluid communication with the second channel; and
   a second primary channel in fluid communication with the first channel;
   wherein the first primary channel and the second primary channel are configured for directing fluid toward the exit opening.

8. The channel subassembly of claim 7, wherein the at least one property of the fluid comprises a viscosity of the fluid above a threshold, the threshold being based on a physical configuration of the fluid flow control device, the fluid flow control device being configured for restricting fluid flow by an amount that is based on the viscosity of the fluid.

9. The channel subassembly of claim 6, wherein the fourth channel is a primary channel in fluid communication with the first channel, the primary channel being configured for directing fluid toward the exit opening.

* * * * *